United States Patent [19]

Ching

[11] 4,373,060

[45] Feb. 8, 1983

[54] SILICONE COATING FOR UNPRIMED PLASTIC SUBSTRATE AND COATED ARTICLES

[75] Inventor: Ta-Yen Ching, Schenectady, N.Y.

[73] Assignee: General Electric Company, Waterford, N.Y.

[21] Appl. No.: 154,623

[22] Filed: May 30, 1980

[51] Int. Cl.$^3$ .................. C08K 3/20; C08L 83/06
[52] U.S. Cl. .................. 524/767; 106/287.12; 106/287.13; 106/287.14; 524/837; 524/838
[58] Field of Search .................. 106/287.12, 287.13, 106/287.14; 260/29.2 M; 448/447; 524/767, 837, 838

[56] References Cited

U.S. PATENT DOCUMENTS

| | | | |
|---|---|---|---|
| 3,708,225 | 1/1973 | Misch et al. | 428/447 |
| 3,976,497 | 8/1976 | Clark | 106/287.12 |
| 3,986,997 | 10/1976 | Clark | 260/29.2 M |
| 4,027,073 | 5/1977 | Clark | 260/29.2 M |
| 4,051,161 | 9/1977 | Proskow | 106/287.12 |
| 4,159,206 | 1/1979 | Armbruster et al. | 106/287.12 |
| 4,177,315 | 12/1979 | Ubersax | 260/29.2 M |
| 4,188,451 | 2/1980 | Humphrey, Jr. | 428/447 |

OTHER PUBLICATIONS

Kirk–Othmer, "Encyclopedia of Chemical Technology", vol. 18, Interscience Publishers, N.Y., (1969), pp. 61 & 62.

*Primary Examiner*—Allan Lieberman

[57] ABSTRACT

A silicone hardcoat composition for plastic substrates is provided in the form of an aqueous cohydrolyzate of chemically combined siloxy units, organosiloxy units and siloxy units having from 1–3 chemically combined UV stabilizing organic groups attached to silicon by carbon-silicon bonds. Thermoplastic substrates treated with such silicone hardcoat compositions are also provided.

12 Claims, No Drawings

SILICONE COATING FOR UNPRIMED PLASTIC SUBSTRATE AND COATED ARTICLES

This invention relates to improved protective coating compositions. More particularly, it relates to a silicone resin coating composition, especially adapted for primerless adhesion to plastic substrates, which when applied to these and other plastic substrates forms a protective abrasion and ultraviolet-resistant coating thereon.

BACKGROUND OF THE INVENTION

Recently, the substitution of glass glazing with transparent materials which do not shatter or are more resistant to shattering than glass, has become widespread. For example, transparent glazing made from synthetic organic polymers is now utilized in public transportation vehicles, such as trains, buses, taxis and airplanes. Lenses, such as for eye glasses and other optical instruments, as well as glazing for large buildings, also employ shatter-resistant transparent plastics. The lighter weight of these plastics in comparison to glass is a further advantage, especially in the transportation industry where the weight of the vehicle is a major factor in its fuel economy.

While transparent plastics provide the major advantage of being more resistant to shattering than glass, a serious drawback lies in the ease with which these plastics mar and scratch, due to everyday contact with abrasives, such as dust, cleaning equipment and ordinary weathering. Continuous scratching and marring results in impaired visibility and poor aesthetics, and oftentimes requires replacement of the glazing or lens or the like.

One of the most promising and widely used transparent plastics for glazing is polycarbonate, such as LEXAN ® resin, sold by General Electric Company. It is a tough material, having high impact strength, high heat deflection temperature, good dimensional stability, as well as being self-extinguishing, and is easily fabricated. Acrylics, such as polymethylmethacrylates, like PLEXIGLAS ® resin, are also commonly and widely used glazing and lens materials.

Attempts have been made to improve the abrasion resistance of these transparent plastics. For example, scratch resistant coatings formed from mixtures of silica, such as colloidal silica or silica gel, and hydrolyzable silanes in a hydrolysis medium, such as alcohol and water, are known. Misch et al., U.S. Pat. No. 3,708,225; Clark, 3,986,997, 3,976,497 and 4,027,073; Armbruster et al., 4,159,206; and Ubersax, 4,177,315, for example, describe such compositions. Improved such compositions are also described in commonly-assigned copending U.S. Application Ser. No. 964,910, filed Nov. 30, 1978, and in U.S. Pat. No. 4,277,287 (Frye) on Nov. 30, 1978.

It has been discovered that such polysilicic acid coatings, especially if acidic, fail to adhere to certain plastic substrates, such as polycarbonate, and, even if prepared on the basic side of neutrality, they may adhere initially, but they will peel after brief light aging. In U.S. Pat. No. 4,299,746 (Frye), the addition of an ultraviolet (uv) light screening agent, such as 2,4-dihydroxy-benzophenone, is suggested, but in some cases this may have a plasticizing effect and polycarbonate seems to have a tendency to reject the coating on severe exposure. Another approach is to use a two-coat system in which, for example, an acrylic primer is first laid down, and this adheres to both the silicone and the polycarbonate resins and also serves as a binder for high levels of UV screens. The second coat is put on over the primer coat. See, for example, commonly assigned Humphrey, Jr., U.S. Pat. No. 4,188,451, and Application Ser. No. 964,911, filed Nov. 30, 1978. To avoid the need for a primer, commonly assigned copending Application Ser. No. 34,164, filed Apr. 27, 1979, suggests replacing the usual solvents, e.g., isobutanol, with a more aggressive solvent, e.g., an ester, a ketone, a nitroparaffin, or the like. However, these are expensive and generally might require process modifications.

The use of modified organic UV screens in related compositions is also known from Proskow U.S. patent 4,051,161. Proskow describes the use of certain reaction products of an organic UV stabilizer and an epoxy silane. The reaction products have divalent connecting aliphatic secondary alcohol radicals between the silicon atom and the organic stabilizing group which are inherently oxidatively unstable. These reaction products of Proskow are utilized in a mixture of polysilicic acid and a haloethylene-hydroxy vinylether copolymer.

Alkoxy silanes useful as UV screens having organic UV stabilizing groups attached to silicon through divalent aliphatic connecting groups free of such oxidatively unstable secondary alcohol functionality are also shown in commonly assigned U.S. Pat. No. 4,278,804; Ashby, U.S. Pat. No. 4,321,400; U.S. Pat. Nos. Ching, 4,307,240; Ching, 4,316,033; Ching Ser. No. 154,624, filed concurrently herewith. All of the above-mentioned patents, as well as the application, are incorporated herein by reference.

It has now been discovered that aqueous cohydrolyzates of polysilicic acid and such alkoxy silanes can be directly applied onto a thermoplastic substrate as a silicon hardcoat without the use of primer, or haloethylene-hydroxy vinyl ether copolymer adhesive promoter to produce composite articles having superior photostability and abrasion resistance. Accordingly, aqueous cohydrolyzates made in accordance with the practice of the present invention, as defined hereinafter, can be applied directly onto an unprimed thermoplastic substrate without an additional adhesive such as a haloethylene-hydroxy vinyl ether copolymer. By way of illustration, hydrolysis of 0.8 to 4 parts (or 4-20% based on solids) of the alkoxysilane-functionalized UV screens, such as ($\gamma$-triethoxysilane)-propyl-3,3-diphenyl-2-cyanoacrylamide, 2-hydroxy-3-($\gamma$-triethoxy silane)propyl-5-methylphenyl benzotriazole, and the like, with 100 parts of a polysilic acid hardcoat solution for 10 days, e.g., at pH 6.8–7.8, results in novel UV screen-containing silicone hardcoats. These improved silicone coatings are adapted for use directly on plastics, e.g., polycarbonates and acrylics, without a primer.

SUMMARY OF THE INVENTION

There is provided by the present invention a method for making an aqueous cohydrolyzate adapted for adhesion to a plastic substrate without a primer which comprises cohydrolyzing at a temperature of at least 10° C. for a period of at least 2 hours at a pH of 6.6 to 7.8 or 3.8 to 5.7, (A) a dispersion of colloidal silica in an aqueous-organic solvent solution of the partial condensate of a silanol of the formula $RSi(OH)_3$, at least 50 weight percent of the silanol being $CH_3Si(OH)_3$, wherein said organic solvent comprises an aliphatic alcohol; and (B) a stabilizing amount of an alkoxysilane functionalized aromatic ultraviolet absorbing compound selected from the class consisting of

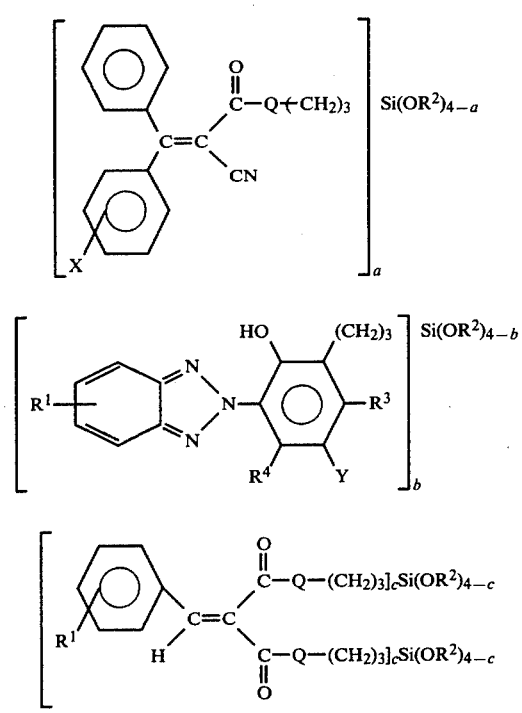

(iv) and mixtures thereof,
where (A) contains 10 to 40% solids consisting essentially of 10 to 70 weight percent of colloidal silica and 30 to 90 weight percent of the partial condensate, R is selected from the group consisting of $C_{(1-3)}$ alkyl radicals and $C_{(6-13)}$ aryl radicals, $R^1$ is selected from the class consisting of hydrogen, $C_1$-$C_8$ alkoxy, carboxy, halogen, hydroxy, amino, carbethoxy and —Q—$(CH_2)_3Si(OR^2)$, X is $R^1$ or

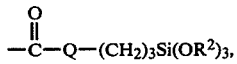

Q is -NH- or -O-, $R^2$ is $C_1$-$C_8$ alkyl, $R^3$ is a member selected from the class consisting of hydrogen, halogen, hydroxy, $C_1$-$C_8$ alkyl and $C_1$-$C_8$ alkoxy, $R^4$ is a member selected from hydrogen, $C_1$-$C_8$ alkyl, $C_1$-$C_8$ alkoxy and halogen, Y is $R^4$ or -$CH_2)_3Si(OR^2)_3$, and a, b and c are integers equal to 1 to 3 inclusive.

In another aspect of the invention there are also provided coating compositions useful as top coats for thermoplastic substrates, such as LEXAN® polycarbonate, without need to use a primer layer whereby there are produced composites having at least one coated abrasion resistant and UV stabilized surface, said coating composition comprising by weight (C) 55 to 90% of a solvent consisting essentially of water and a $C_{(1-8)}$ alkanol and (D) 10 to 45% of a cohydrolyzate which comprises organopolysiloxane and having from about 25–50 mole percent of $SiO_2$ units chemically combined with from about 40–75 mole percent of $RSiO_{1.5}$ units and from about 0 to 10 mole percent of $(R)_2(SiO)$ units and from about 0.5 to 5 mole percent of $(Z)_dSiO_{(4-d)/2}$ or $(Z')=SiO_{1.5}$, where the total chemically combined units are 100 mole percent, where d is an integer having a value of 1–3 inclusive and Z is a member selected from the class consisting of

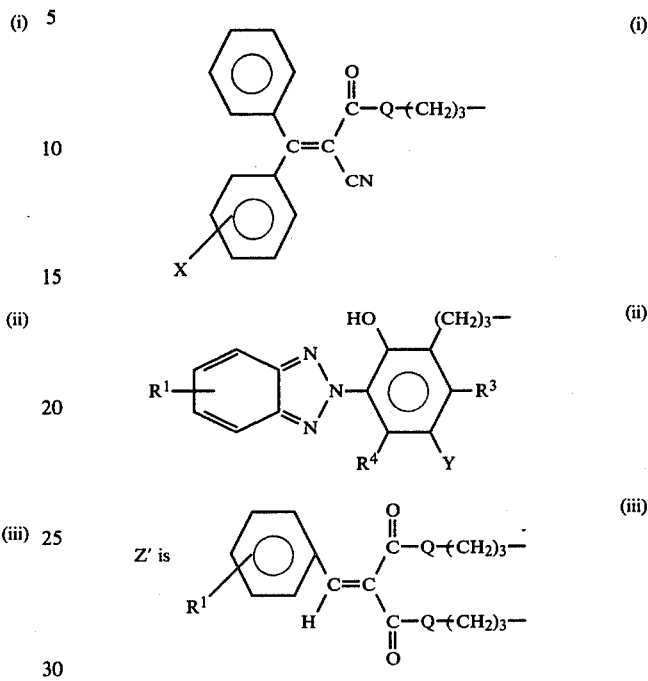

where R' is selected from the class consisting of hydrogen, $C_1$-$C_8$ alkoxy, carboxy, halogen, hydroxy, amino, carbethoxy and —Q—$(CH_2)_3Si(OR^2)_3$, X is $R^1$ or

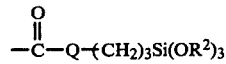

Q is -NH- or -O-, $R^2$ is $C_1$-$C_8$ alkyl, $R^3$ is a member selected from the class consisting of hydrogen, halogen, hydroxy $C_1$-$C_8$ alkyl and $C_1$-$C_8$ alkoxy, $R^4$ is a member selected from hydrogen, $C_1$-$C_8$ alkyl, $C_1$-$C_8$ alkoxy and halogen, and Y is $R^4$ or —$CH_2)_3Si(OR^2)_3$.

Also contemplated are articles of manufacture comprising composites of an unprimed solid substrate having at least one surface coated with a coating composition as defined immediately above. In addition, the invention contemplates such articles in which the coating composition has been cured on the unprimed surface of the solid substrate.

DETAILED DESCRIPTION OF THE INVENTION

The coating compositions of this invention are prepared by hydrolyzing a trialkoxysilane or a mixture of trialkoxysilanes of the formula $RSi(OR')_3$, wherein R is alkyl of from 1 to 3 carbons or aryl, such as phenyl, and R' is alkyl, in an aqueous dispersion of colloidal silica, in thorough admixture with the functionalized ultraviolet light absorbing compound, and aging the mixture for a period of at least 2 hours at a temperature of at least 10° C.

In the practice of the present invention, suitable aqueous colloidal silica dispersions generally have a particle size of from 5 to 150 millimicrons in diameter. These silica dispersions are well known in the art and commercially available ones include, for example, those sold under the trademarks of Ludox (DuPont) and Nalcoag (NALCO Chemical Co.). Such colloidal silicas are available as both acidic and basic hydrosols. For the purposes of this invention, basic colloidal silica sols are preferred. However, acidic colloidal silicas are also contemplated. In addition, it has been found that colloidal silicas having a low alkali content (e.g., Na$_2$O) yield a more stable coating composition. Thus, colloidal silica having an alkali content of less than 0.35% (calculated as Na$_2$O) is preferred. Moreover, colloidal silicas having average particle size of from 10 to 30 millimicrons are also preferred. A particularly preferred one for the purposes herein is known as Ludox LS, sold by DuPont Company.

In accordance with this invention, the aqueous colloidal silica dispersion is added to a solution of a small amount of alkyltriacetoxysilane or acetic acid in alkyltrialkoxysilane or aryltrialkoxysilane.* The temperature of the reaction mixture is maintained at about 20° C. to about 40° C. and preferably below 25° C. It has been found that in about six to eight hours sufficient trialkoxysilane has reacted to reduce the initial two-phase liquid mixture to one liquid phase in which the now treated silica (i.e., treated by admixture with the trialkoxysilane) is dispersed. In general, the hydrolysis reaction is allowed to continue for a total of about 12 hours to 48 hours, depending upon the desired viscosity of the final product. The more time the hydrolysis reaction is permitted to continue, the higher will be the viscosity of the product. After hydrolysis has been completed, the solids content is adjusted by the addition of alcohol, preferably isobutanol, to the reaction mixture. Other suitable alcohols for this purpose include lower aliphatic alcohols such as methanol, ethanol, propanol, isopropanol, n-butyl alcohol and t-butyl alcohol. Mixtures of such alcohols can be used, too. The solvent system should contain from about 20 to 75 weight percent alcohol to ensure solubility of the partial condensate (siloxanol). Optionally, additional water-miscible polar solvents, such as acetone, butylcellosolve and the like in minor amounts, like no more than 20 weight percent of the cosolvent system, can also be employed. The solids content of the coating composition of this invention is generally preferred to be in the range of from about 18 to 25%, most preferably about 20%, by weight of the total composition consisting essentially of about 32 weight percent colloidal silica, about 64 weight percent of the partial condensate and about 4 weight percent of the functionalized ultraviolet light absorber to be discussed in more detail hereinafter. The pH of the resultant reacted composition (i.e., prior to addition of the ultraviolet light absorber), is in the range of from about 3.5 to 8.0, preferably from about 6.6 to about 7.8 or from 3.8 to 5.7. If necessary, dilute base, such as ammonium hydroxide, or weak acid, such as acetic acid, may be added to the composition to adjust the pH to the desired range.

*If desired, small amounts of dialkyl dialkoxysilane also can be utilized in the reaction mixture.

If desired, polysiloxane polyether copolymers, disclosed in the aforementioned U.S. Pat. No. 4,277,287 (Frye) which act as flow control agents, may optionally be added to the compositions herein after the hydrolysis is completed. Preferably, however, they may be added to the composition after the initial solids content has been diluted with alcohol. As indicated, the polysiloxane polyether copolymer acts as a flow control agent and thereby prevents flowmarks, dirtmarks, and the like, on the surface of the substrate to which the coating is subsequently applied. For the purposes of this invention, the polysiloxane ether copolymer may be employed in an amount of from about 2.5 to about 15% by weight of the total solids of the composition. Most advantageous results may be achieved when the copolymer is utilized at about 4% by weight of the total solids. At these amounts, the polysiloxane polyether copolymer prevents marks on the substrate which impair visibility or are aesthetically detracting and has no significant deleterious effects on the otherwise good abrasion resistance, scribed adhesion, ultraviolet light resistance, moisture and humidity resistance of the coating. Moreover, the presence of the polysiloxane polyether copolymer additive is found to reduce the incidence of stress cracking in the hard coating.

Although the polysiloxane polyether copolymer slightly raises the viscosity of the coating composition, it does not accelerate the rate of viscosity increase with age of the composition, nor does it shorten the shelflife of the composition. The polysiloxane polyether copolymer is completely compatible with the alcohol-water cosolvent system of the compositions herein and becomes a permanent part of the cured coating, not removed by washing, even with soap and water.

More specifically, some of the polysiloxane polyether copolymers which may be used in the practice of the invention herein are liquid organopolysiloxane copolymers having the formula:

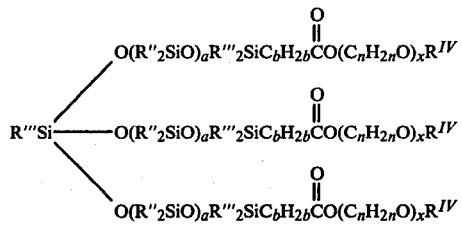

wherein R″ and R‴ are monovalent hydrocarbon radicals; R$^{iv}$ is a lower alkyl radical; a has a value of at least 2, e.g., from about 2 to 40 or more; b has a value of from 2 to 3, n has a value of from 2 to 4 and x has a value of at least 5, e.g., from 5 to 100 or more.

Among the radicals represented by R″ and R‴ in the above formula can be mentioned, for example, alkyl radicals, e.g., methyl, ethyl, propyl, butyl, octyl, etc.; cycloalkyl radicals, e.g., cyclohexyl, cycloheptyl, etc.; aryl radicals, e.g., phenyl, tolyl, naphthyl, xylyl, etc.; aralkyl, e.g., benzyl, phenylethyl, etc., alkenyl and cycloalkenyl, e.g., vinyl, allyl, cyclohexenyl, etc.; and helogenated radicals of the aforementioned type, e.g., chlormethyl, chlorophenyl, dibromophenyl, etc. R is lower alkyl, e.g., an alkyl radical containing from 1 to about 7 carbon atoms, such as methyl, ethyl, propyl, butyl, isobutyl, amyl, etc. The preparation and description of these polysiloxane polyether copolymers is disclosed in U.S. Pat. No. 3,629,165, which is incorporated herein by reference. In the above formula R″ is preferably methyl, R‴ is preferably methyl, R is preferably butyl, a is preferably 4, b is preferably 3, n is preferably 2.4, and x is preferably 28.5. Particularly suitable polysiloxane polyether copolymers for the purpose of this invention include the materials known as SF-1066 and SF-1141, made by General Electric Company, BYK-300, sold by Mallinckrodt, L-540, L-538, sold by Union Carbide, and DC-190, sold by Dow Corning.

The alkyltriacetoxysilane is used to buffer the basicity of the initial two liquid phase reaction mixture and thereby also temper the hydrolysis rate. While the use of alkyltriacetoxysilane is preferred herein, glacial acetic acid may be used in its place, as well as other acids such as organic acids like propionic, butyric, citric, benzoic, formic, oxalic, and the like. Alkyltriacetoxysilanes wherein the alkyl group contains from 1–6 carbon atoms can be used, alkyl groups having from 1 to 3 carbon atoms being preferred. Methyltriacetoxysilane is most preferred.

The silanetriols, RSi(OH)$_3$, hereinbefore mentioned, are formed in situ as a result of the admixture of the corresponding trialkoxysilanes with the aqueous medium, i.e., the aqueous dispersion of colloidal silica. Exemplary trialkoxysilanes are those containing methoxy, ethoxy, isopropoxy and n-butoxy substituents which, upon hydrolysis, generate the silanetriol and further liberate the corresponding alcohol. In this way, at least a portion of the alcohol content present in the final coating composition is provided. Of course, if a mixture of trialkoxysilanes is employed, as provided for hereinabove, a mixture of different silanetriols, as well as different alcohols, is generated. Upon the generation of the silanetriol or mixtures of silanetriols in the basic aqueous medium, condensation of the hydroxyl substituents to form

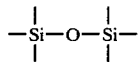

bonding occurs. This condensation takes place over a period of time and is not an exhausting condensation but rather the siloxane retains an appreciable quantity of silicon-bonded hydroxyl groups which render the polymer soluble in the alcohol-water cosolvent. It is believed that this soluble partial condensate can be characterized as a siloxanol polymer having at least one silicon-bonded hydroxyl group per every three

units.

The non-volatile solids portion of the coating composition herein is a mixture of colloidal silica and the partial condensate (or siloxanol) of a silanol. The major portion or all of the partial condensate or siloxanol is obtained from the condensation of CH$_3$Si(OH)$_3$ and, depending upon the input of ingredients to the hydrolysis reaction, minor portions of partial condensate can be obtained, for example, from the condensation of CH$_3$Si(OH)$_3$ with C$_2$H$_5$Si(OH)$_3$ or C$_3$H$_7$Si(OH)$_3$; CH$_3$Si(OH)$_3$ with C$_6$H$_5$Si(OH)$_3$, or even mixtures of the foregoing. For optimum results in the cured coating it is preferred to use all methyltrimethoxysilane (thus generating all monomethylsilanetriol) in preparing the coating compositions herein the partial condensate is present in an amount of from about 55 to 75 weight percent of the total solids in a cosolvent of alcohol and water, the alcohol comprising from about 50% to 95% by weight of the cosolvent.

The functionalized ultraviolet light absorbing compounds used in accordance with the present invention must be soluble in, and otherwise compatible with, the silicone resin hydrolyzate. They copolymerize into the silicone as demonstrated by the low volatility upon curing and continuous heating. The uv compounds used in this invention are particularly effective in protecting polycarbonate from discoloration when the present coating compositions are applied to the surface thereof.

The alkoxysilane functionalized-cyanoacrylamide and -cyanoacrylate light stabilizers designated (i) above can be made following the description in the above-mentioned Ching, U.S. Pat. No. 4,307,204. A general method is to convert the corresponding diarylcyanoacrylate ester to an acyl halide, e.g., with sodium hydroxide in aqueous methanol followed by treatment with thionyl chloride, and then to functionalize this by reaction with an aminoalkyl alkoxysilane, such as γ-aminopropyltriethoxysilane, or a hydroxyalkyl-substituted olefin, such as alkyl alcohol, followed by hydrosilation, e.g., with triethoxysilane, in the presence of a platinum catalyst.

The alkoxysilane functionalized benzotriazole light stabilizers designated (ii) above can be made following the description in the above-mentioned Ching U.S. Pat. No. 4,316,033. A general method is to convert a 1-N-hydroxyphenylbenzotriazole, e.g., TINUVIN P ®, to the corresponding allyl ether with allyl bromide in refluxing acetone in the presence of potassium carbonate, rearrange with heat to a hydroxy allylphenyl-substituted benzotriazole and to hydrosilane with HSi(OR)$_3$ in the presence of a platinum catalyst. An alternative is to hydrosilate with HSiCl$_3$ followed by alcoholysis.

The functionalized arylidene malonate light stabilizers, designated (iii) above, can also be made following procedures set forth in the above-mentioned Ching, U.S. Pat. No. 4,307,240. A general method is to convert the corresponding arylidene malonate to a diallyl ester by ester exchange with a hydroxyalkyl-substituted olefin, such as allyl alcohol, followed by hydrosilation, e.g., with triethoxysilane, in the presence of a platinum catalyst.

Specific preparative procedures for preferred embodiments are included in the instant specification.

Any amount of functionalized ultraviolet light absorber which is effective to prevent discoloration of the substrate to which the composition will be applied can be used herein. In general, it has been found that best results are obtained if the ultraviolet light absorber is employed in amounts of from 4–20% by weight of the total solids of the coating composition.

It has been found essential for primerless adhesion that, after thoroughly admixing the ultraviolet light absorber with the resin hydrolyzate, the total admixture must be allowed to age before use. By aging, it is meant standing at 10° C. or above, preferably at about room temperature, e.g., 18°–24° C., for at least 42 hours, but preferably for a minimum time of from about 5 to 10 days. While the nature of aging process with respect to the compositions of this invention is not fully understood, it is believed that the ultraviolet light absorber is actually being chemically incorporated into the structure of the hydrolyzate. In any event, it has been found that if the compositions of this invention are not properly aged after the addition of the ultraviolet light absorber inferior adhesion of the coating to the unprimed substrate and poorer abrasion resistance may result.

The coating compositions of this invention will cure on a substrate at temperatures of, for example, 125° C. without the aid of an added curing catalyst. If one wishes to employ more desirable milder curing conditions, and/or decrease the cure time, buffered latent condensation catalysts can be added. Included in this class of catalysts are alkali metal salts of carboxylic acids, such as sodium acetate, potassium formate and the like. Amine carboxylates, such as dimethylamine acetate, ethanolamine acetate, dimethylaniline formate and the like, quaternary ammonium carboxylates such as tetramethylammonium acetate, benzyltrimethylammonium acetate, metal carboxylates, like tin octoate and amines such as triethylamine, triethanolamine, pyridine and the like are also contemplated curing catalysts herein. Alkali hydroxides, like sodium hydroxide and ammonium hydroxide can also be used as curing catalysts herein. Moreover, typical commercially available colloidal silica, especially those having a basic pH, contain free alkali metal base and alkali metal carboxylate catalysts will be generated in situ during the hydrolysis reaction herein.

The amount of curing catalysts can be varied within a wide range, depending upon the desired curing conditions. However, in general, catalyst in the amounts of from about 0.05 to about 0.5 weight percent, preferably about 0.1 weight percent, of the composition can be used. Compositions containing catalysts in these amounts can be cured on a solid substrate in a relatively short time at temperatures in the range of from about 75° C.–150° C. to provide a transparent abrasion resistant surface coating.

The coating compositions of the present invention can be applied to a variety of solid substrates by conventional methods, such as flowing, spraying or dipping, to form a continuous surface film. Substrates which are especially contemplated herein are transparent, as well as non-transparent, plastics and metals. More particularly, these plastics are synthetic organic polymeric substrates such as acrylic polymers, like poly(methyl methacrylate), polyesters, such as poly(ethylene terephthalate), poly(butylene terephthalate), etc., polyamides, polyimides, acrylonitrile-styrene copolymers, styrene-acrylonitrile-butadiene copolymers, polyvinyl chloride, butyrates, polyethylene and the like. As noted above, the coating compositions of this invention are especially useful as mar-resistant and discolorable resistant coatings for polycarbonates, such as those polycarbonates known as LEXAN ® resin, sold by General Electric Company. The metal substrates on which the present protective coatings are utilized include bright and dull metals like aluminum and bright metallized surfaces like sputtered chromium alloy. Other solid substrates contemplated herein include wood, painted surfaces, leather, glass, ceramics and textiles.

By choice of the proper formulation, application conditions and pretreatment, the coatings can be adhered to substantially all solid substrates. A hard coating having all of the aforementioned characteristics and advantages is obtained by the removal of the solvent and volatile materials. The coating composition will air-dry to a tack-free condition, but heating in the range of 75° C. to 200° C. is necessary to obtain condensation of residual silanols in the partial condensate. This final cure results in the formation of silsesquioxane (RSiO$_{3/2}$). In the finished cured coating the ratio of RSiO$_{3/2}$ units to SiO$_2$ will range from about 0.43 to about 9.0, preferably 1 to 3. A cured coating having a ratio of RSiO$_{3/2}$ to SiO$_2$, where R is methyl, of 2 is most preferred. The coating thickness can be varied by means of the particular application technique, but coatings of about 0.5 to 20 microns, preferably 2–10 micron thickness are generally utilized.

In order that those skilled in the art may better understand how to practice the present invention, the following examples are given by way of illustration and not by way of limitation.

EXAMPLE 1

β,β-Diphenyl-α-cyanoacrylic acid (I).

To 200 ml. of methanol:water (1:4) solution containing 55 g. (0.2 mole) of ethyl β,β-diphenyl-α-cyanoacrylate (CYASORB N-35, American Cyanamid), 18 g. of 50% NaOH (0.22 mole) is added and the soluton is stirred at about 20° C. overnight. After it is washed with ether, the aqueous solution is neutralized with dilute HCl to precipitate the product. The yield is 48 g., 97%, m.p., 207°–209° C.

β,β-Diphenyl-α-cyanoacrylic chloride (II).

To 100 ml. of toluene solution containing 50 g. (0.2 mole) of β,β-diphenyl-α-cyanoacrylic acid, 30 g. (0.25 mole) of thionyl chloride is added and the solution is refluxed overnight. After cooling, yellow prisms are collected to give 49.5 g., 92% yield of product, m.p. 157°–158° C.

(3-Triethoxysilanepropyl)-β;β-diphenyl-α-cyanoacrylamide (III).

To a tetrahydrofuran solution containing 2.21 g. (0.01 mole) of γ-aminopropyltriethoxysilane and 1.01 g. (0.01 mole) of triethylamine, 2.67 g. of compound II is added and the solution is stirred at 20° C. for 30 min. After filtering the triethylamine hydrochloride salt, compound III is precipitated by adding hexane; yield 4.0 g., 88.5% yield, m.p., 103.5°–104° C.

To a mixture of 20.3 g. of methyl trimethoxysilane and 0.06 g. of acetic acid, 16.7 g. of LUDOX LS silica sol(aqueous dispersion of 30% colloidal silica, average particle size 12 millimicrons, pH 8.2, DuPont), and the two-phase solution is stirred at 20°–30° C. for 16 hrs. Thirty-eight grams of isobutanol is then introduced, followed by 0.6 g. of surface reagent SF-1066, General Electric Company silicone-polyether flow control agent, and Compound III is added at 10% solids and the composition is permitted to age for 7 days at 20° C. Based on method of preparation, there is obtained a coating composition having 20% by weight of solid consisting essentially of cohydrolyzate of about 35.5 mole percent of SiO$_2$ units chemically combined with about 63.1 mole percent of CH$_3$SiO$_{1.5}$ units and about 1.4 mole percent of chemically combined

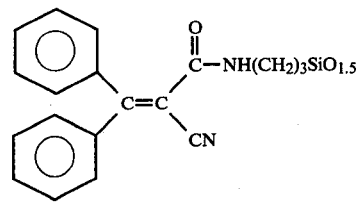

units. For control purposes, no compound III is added to the same silicone compositions. Plaques of unprimed Lexan ® resin are coated with the formulations, air dried for 30 minutes, then cured at 125° C. for 60 minutes.

Resistance to moisture and light are evaluated in a OUV accelerated Weathering Tester (8 hr. UV cycle at 70° C./4 hr. condensation cycle at 50° C.) by rapidly measuring scribed adhesion (1 tape pull on a scribed criss-cross pattern) on a panel removed from the condensation cycle and patted dry with a towel. Adhesion is tested by the cross hatch method. The coated panels are cut with a lattice cutting tester (Erichsen, Germany) and tested with an adhesive tape. Resistance to boiling water is determined by immersing the sheets in boiling distilled water for 1 hour and conducting the cross-hatch-pulling tape test while the surface is still moist. In both cases, only 100% retention of adhesion is considered pass. The results of adhesion and appearance tests are: With compound III, pass in QUV after 300 hours; without compound III in QUV, failed after 50 hrs.; with compound III, colorless appearance; without compound III, yellow and cracks.

EXAMPLE 2

2-Allyloxy-5-methylphenylbenzotriazole (IV).

A mixture of 22.5 g. (0.1 mole) of 2-hydroxy-5-methylbenzotriazole (TINUVIN P ® Ciba-Geigy), 13.2 g. (0.11 mole) of allyl bromide 14 g. (0.1 mole) of potassium carbonate and 100 ml. of acetone is refluxed overnight. After cooling, the inorganic salts are removed by filtration. The organic solution is washed with 5% aqueous NaOH and extracted with $CH_2Cl_2$. The basic material is neutralized to give 5.4 g., 24%, of the unreacted starting material. The organic layer is condensed to give 16.2 g., 61% yield, of light yellow oil.

3-Allyl-2-hydroxy-5-methylphenyl benzotriazole (V).

Compound IV is heated at 200° C. under nitrogen for 1.5 hours and light yellow crystals form on cooling. Recrystallization from methanol/chloroform gives compound V, m.p. 97°–99° C., yield 72%.

2-Hydroxy-3-(γ-triethoxysilanepropyl)-5-methylphenyl benzotriazole (VI).

To a mixture of 5.54 g. (0.02 mole) of V and 3.30 g. (0.02 mole) of $HSi(OC_2H_5)_3$ in 100 ml. of dry toluene is added 20 drops of 5% platinum hydrosilation catalyst and the solution is stirred at 60° C. for 1 hr. Evaporation of the solvent gives a quantitative yield of product in the form of a light yellow oil.

Addition of 10% of compound VI based on solids to a 20% solids silicone resin prepared according to Example 1 and aging for 5 days at 25° C. provides a coating composition according to this invention. Based on the method of preparation the composition has 20% by weight of solid consisting essentially of cohydrolyzate having about 35.5 mole percent of $SiO_2$ units chemically combined with about 63 mole percent of $CH_3SiO_{0.5}$ units and about 1.5 mole percent of

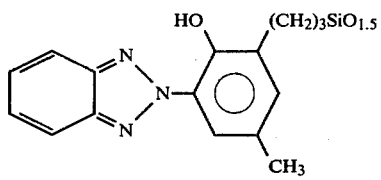

units. Applying the aged composition to an unprimed polycarbonate substrate and then curing for 60 minutes at 125° C. provides photostable, abrasion resistant composites according to this invention.

The UV screens copolymerized into the coating compositions of the present invention as shown by Examples 1 and 2 are evaluated for volatility against commercial organic UV screens. The organic UV screens are mixed directly into the polysilicic acid formulation following the same procedure in place of alkoxysilanes having chemically combined UV stabilizing organic groups attached to silicon by carbon-silicon bonds. The following results are found after the resulting coating compositions were used to treat Lexan resin substrates in a similar manner, where "organic" is dihydroxybenzophenone, "CASi" is the alkoxysilane of Example 1, and "BTSi" is the alkoxy silane of Example 2:

TABLE II

| | UV Screen Volatility* | | | | |
|---|---|---|---|---|---|
| | % weight loss after heating period (hrs) at 125° C. | | | | |
| | 1 | 2 | 4 | 6 | 24 |
| Organic | 27 | 46 | 55 | 60 | 69 |
| CASi | 0 | 3 | 0 | 3 | 3 |
| BTSi | 20 | 20 | 20 | 24 | 25 |

*10% UV screen, monitored by UV spectroscopy solvent effect on absorptivity uncorrected The above results show the alkoxysilanes used in the coating compositions of the present invention are chemically combined.

Obviously, other modifications and variations of the present invention are possible in light of the above teachings. For example, for added protection, mixtures of any of the functionalized ultraviolet light absorbers disclosed herein may also be used. Acrylic sheet or film can be substituted for the polycarbonate plaques, etc.

I claim:

1. A method for making an improved coating composition which comprises making an aqueous cohydrolyzate adapted for adhesion to a plastic substrate without a primer which comprises cohydrolyzing at a temperature of at least 10° C. for a period of at least 2 hours and at a pH of 6.6 to 7.8 or 3.8 to 5.7 prior to addition of an ultraviolet light absorber, (A) a dispersion of colloidal silica in an aqueous-organic solvent solution of a silanol of the formula $RSi(OH)_3$, at least 50 weight percent of the silanol being $CH_3Si(OH)_3$, wherein said organic solvent comprises an aliphatic alcohol; and (B) a stabilizing amount effective to prevent discoloration of the substrate and promote primerless adhesion to said substrate of an alkoxysilane functionalized aromatic ultraviolet absorbing compound selected from the class consisting of

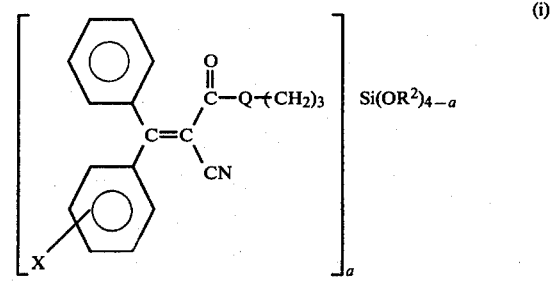

-continued

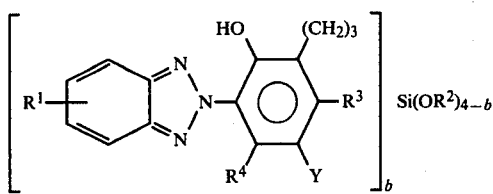
(ii)

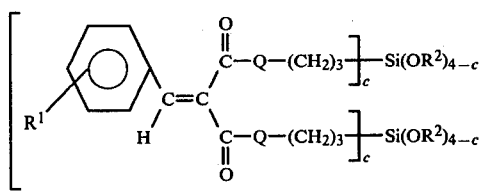
(iii)

and mixtures thereof, (iv)

where (A) contains 10 to 40% solids consisting essentially of 10 to 70 weight percent of colloidal silica and 30 to 90 weight percent of the partial condensate, R is selected from the group consisting of $C_{(1-3)}$ alkyl radicals and $C_{(6-13)}$ aryl radicals, $R^1$ is selected from the class consisting of hydrogen, $C_1$-$C_8$ alkoxy, carboxy, halogen, hydroxy, amino, carbethoxy and $-Q-(CH_2)_3Si(OR^2)$, X is $R^1$ or

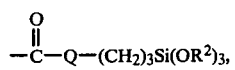

is —NH— or —O—, $R^2$ is $C_1$-$C_8$ alkyl, $R^3$ is a member selected from the class consisting of hydrogen, halogen, hydroxy, $C_1$-$C_8$ alkyl and $C_1$-$C_8$ alkoxy, $R^4$ is a member selected from hydrogen, $C_1$-$C_8$ alkyl, $C_1$-$C_8$ alkoxy and halogen, Y is $R^4$ or $-(CH_2)_3Si(OR^2)_3$, and a, b, and c are integers equal to 1 to 3 inclusive.

2. A method in accordance with claim 1, where the coating composition is allowed to age at least 2 hours at ambient temperatures.

3. A method in accordance with claim 1, where the cohydrolyzate is at a pH of about 6.6 to 7.8.

4. A method for making an improved coating composition which comprises making an aqueous cohydrolyzate adapted for adhesion to a plastic substrate without a primer which comprises cohydrolyzing at a temperature of at least 10° C. for a period of at least 2 hours and at a pH of 6.6 to 7.8 or 3.8 to 5.7 prior to addition of an ultraviolet light absorber, (A) a dispersion of colloidal silica having a particle size ranging from 5 to 150 millimicrons in diameter in an aqueous-organic solvent solution of a silanol of the formula $RSi(OH)_3$ at least 50 weight percent of the silanol being $CH_3Si(OH)_3$, wherein said organic solvent comprises from 20 to 75% by weight of an aliphatic alcohol, and (B) about 4% by weight of an alkoxysilane functionalized aromatic ultraviolet absorbing compound of the formula

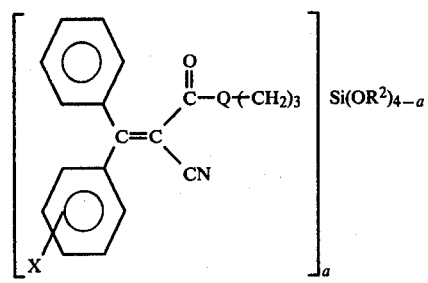
(i)

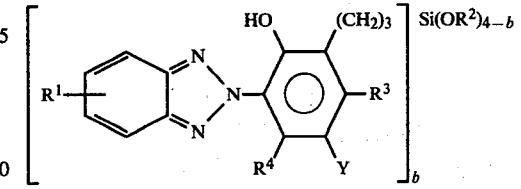
(ii)

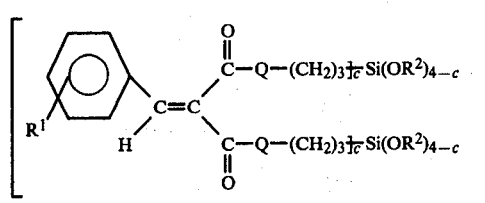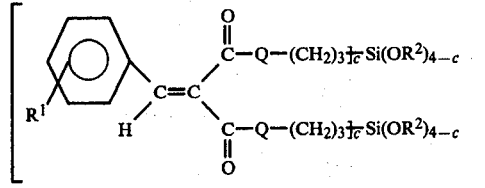
(iii)

and mixtures thereof. (iv)

where (A) contains 10 to 40% solids esentially of 10 to 70 weight percent of colloidal silica and 30 to 90 weight percent of the partial condensate, R is selected from the group consisting of $C_{(1-3)}$ alkyl radicals and $C_{(6-13)}$ aryl radicals, $R^1$ is selected from the class consisting of hydrogen, $C_1$-$C_8$ alkoxy, carboxy, halogen. hydroxy, amino, carbethoxy and $-Q-(CH_2)_3 Si(OR^2)$, X is $R^1$ or

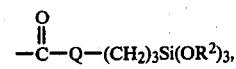

Q is —NH— or —O—, $R^2$ is $C_1$-$C_8$ alkyl, $R^3$ is a member selected from the class consisting of hydrogen, halogen, hydroxy, $C_1$-$C_8$ alkyl and $C_1$-$C_8$ alkoxy, $R^4$ is a member selected from hydrogen, $C_1$-$C_8$ alkyl, $C_1$-$C_8$ alkoxy and halogen, Y is $R^4$ or $-(CH_2)_3Si(OR^2)_3$, and a, b, and c are integers equal to 1 to 3 inclusive.

5. A coating composition adapted for use as a top coat for thermoplastic substrates, without the need to use a primer layer whereby there are produced composites having at least one coated abrasion resistant and UV stabilized surface, said coating composition comprising by weight (C) 55 to 90% of a solvent consisting essentially of water and a $C_{(1-8)}$ alkanol and (D) 10 to 45% of a cohydrolyzate which comprises organopolysiloxane and having from about 25-50 mole percent of $SiO_2$ units chemically combined with from about 40-75 mole percent of $RSiO_{1.5}$ units and from about 0 to 10 mole percent of $(R)_2(SiO)$ units and from about 0.5 to 5 mole percent of $(Z)_dSiO_{(4-d)/2}$ or $(Z')=SiO_{1.5}$, where the total chemically combined units are 100 mole percent, where d is an integer having a value of 1-3 inclusive and Z is a memer selected from the class consisting of

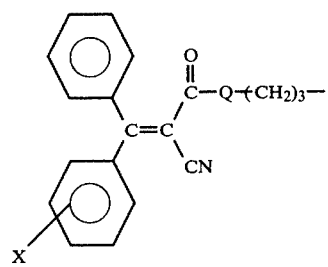 (i)

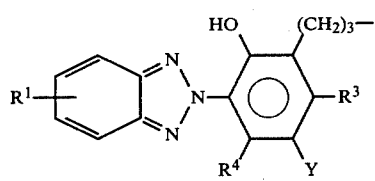 (ii)

Z' is 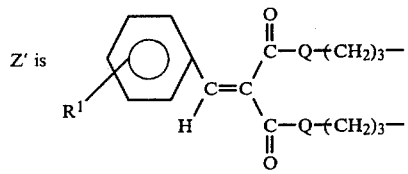 (iii)

where $R^1$ is selected from the class consisting of hydrogen, $C_1$–$C_8$ alkoxy, carboxy, halogen, hydroxy, amino, carbethoxy and —Q—$CH_2$)$_3$Si(OR$^2$)$_3$, X is $R^1$ or

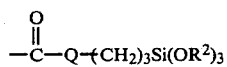

Q is —NH— or —O—, $R^2$ is $C_1$–$C_8$ alkyl, $R^3$ is a member selected from the class consisting of hydrogen, halogen, hydroxy, $C_1$–$C_8$ alkyl and $C_1$–$C_8$ alkoxy, $R^4$ is a member selected from hydrogen, $C_1$–$C_8$ alkyl, $C_1$–$C_8$ alkoxy and halogen, and Y is $R^4$ or —$(CH_2)_3$Si(OR$^2$)$_3$.

6. An aqueous coating composition as defined in claim 5 wherein Z is

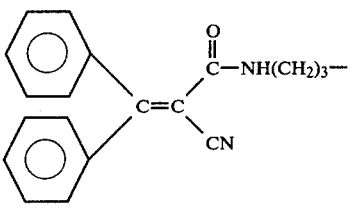

7. An aqueous coating composition as defined in claim 5 wherein Z is

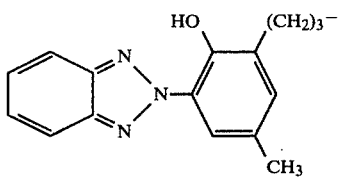

8. An aqueous coating composition as defined in claim 5 wherein the alkanol is methanol.

9. An aqueous coating composition as defined in claim 5 wherein R is $CH_3$.

10. An aqueous coating composition as defined in claim 5 wherein the pH is from about 6.6 to about 7.8.

11. An aqueous coating composition as defined in claim 5 which also includes
a small amount of a polysiloxane polyether copolymer of the structural formula:

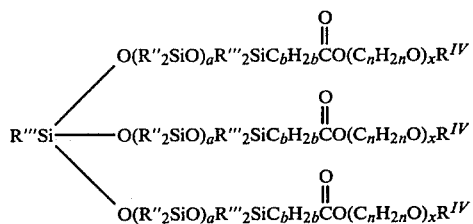

wherein R″ and R‴ are monovalent hydrocarbon radicals; R‴ is a lower alkyl radical, a has a value of at least 2; b is 2 to 3, n is 2 to 4, and x is at least 5.

12. An aqueous coating composition as defined in claim 11 wherein said polysiloxane polyether copolymer is present in an amount of from about 2.5 to about 15% by weight of the total solids of the composition.

* * * * *

UNITED STATES PATENT AND TRADEMARK OFFICE
CERTIFICATE OF CORRECTION

PATENT NO. : 4,373,060
DATED : February 8, 1983
INVENTOR(S) : Ta-Yen Ching

It is certified that error appears in the above—identified patent and that said Letters Patent is hereby corrected as shown below:

In Claim 1, Column 13, line 36, before the word "is" add "Q" to read -- Q is --.

In Claim 5, Column 15, line 35, "—Q—$CH_2$)" should read -- —Q—($CH_2$) --.

In Claim 5, Column 15, line 49, "—$CH_2)_3Si(OR^2)_3$" should read -- —($CH_2)_3Si(OR^2)_3$ --.

In Claim 11, Column 16, line 44, "R'''" should read -- R'' --.

Signed and Sealed this

Twenty-first Day of June 1983

[SEAL]

Attest:

DONALD J. QUIGG

Attesting Officer

Acting Commissioner of Patents and Trademarks